United States Patent [19]

McKenna

[11] Patent Number: 4,760,269

[45] Date of Patent: Jul. 26, 1988

[54] METHOD AND APPARATUS FOR MEASURING DISTANCE TO AN OBJECT

[75] Inventor: Sean J. McKenna, Salem, N.H.

[73] Assignee: The MITRE Corporation, Bedford, Mass.

[21] Appl. No.: 865,090

[22] Filed: May 20, 1986

[51] Int. Cl.⁴ .................. G01N 21/86; G01V 9/04
[52] U.S. Cl. .................................. 250/561; 356/1
[58] Field of Search ............ 250/560, 561, 201 AF; 356/1, 4, 376, 381; 901/47

[56] References Cited

U.S. PATENT DOCUMENTS

| | | | |
|---|---|---|---|
| 4,128,847 | 12/1978 | Roullet et al. | 250/201 |
| 4,453,083 | 6/1984 | Bohländer | 250/561 |
| 4,523,100 | 6/1985 | Payne | 250/561 |
| 4,583,000 | 4/1986 | Pryor | 250/561 |
| 4,602,163 | 7/1986 | Pryor | 250/561 |

Primary Examiner—David C. Nelms
Assistant Examiner—William L. Oen
Attorney, Agent, or Firm—Wolf, Greenfield & Sacks

[57] ABSTRACT

The depth-gauging vision system includes illumination apparatus for projecting a preselected feature upon an object whose distance and orientation are to be determined. A camera is provided for generating an image of the feature reflected from the object. Processing apparatus is provided comparing the reflected image of the feature with the preselected feature itself to determine the distance to the object and its orientation.

11 Claims, 1 Drawing Sheet

METHOD AND APPARATUS FOR MEASURING DISTANCE TO AN OBJECT

BACKGROUND OF THE INVENTION

The present invention relates to depth-gauging vision systems and more particularly to such a system which utilizes the reflected image of a projected feature on the object to determine the object's distance and orientation.

One of the significant problems in intelligent robotics is the automated determination of information about the immediate vicinity of the robot. Many tasks that the robot can perform have the need for vision, and some tasks require three-dimensional information about the work area or workpiece. Such tasks include assembly operations and automated inspection for quality control. Another less traditional use of three-dimensional vision is to provide information required for navigation of a mobile robot in a semi-structured or unstructured environment.

The approach currently used in providing navigation information to a mobile robot has been limited to multiple camera convergence vision systems. In such a system, images of the scene are taken by several cameras. The images are analyzed, and objects common to each camera are noted and compared. By convergence triangulation, the distances to objects in the field of view of the system can be deduced. Stereoscopic vision techniques and structured light techniques have been and are being used to guide robotic arms in welding operations as well as in other assembly operations. Automated inspection also often requires such vision systems.

To analyze the depth structure in such a stereoscopic vision system, the following operations must be performed. First of all, images from two or more cameras must be taken and stored. Then, distinct, unambiguous features must be identified in each of the images. Finally, the features must be correlated among each of the camera images and convergence triangulation operations are performed on each of the features common to two or more images. The known stereoscopic vision systems require substantial image processing capability to extract the depth information. Such systems are thus computationally complicated and expensive.

It is therefore an object of the present invention to provide apparatus for determining depth and orientation of an object which substantially reduced the computational processing required.

Yet another object of the invention is depth gauging apparatus which is more accurate than the known stereoscopic systems.

Yet another object of the invention is depth-gauging apparatus which requires but a single camera.

SUMMARY OF THE INVENTION

These and other objects of the invention are accomplished by providing illumination apparatus for projecting a preselected feature upon the object. Image generating apparatus generates an image of the feature reflected from the object and processing equipment compares the reflected image of the feature with the preselected feature itself to determine the distance to and orientation of an object. In one embodiment, the preselected feature is a pair of spaced apart points of light generated by parallel laser beams. In other embodiments, the preselected feature is a circle, rectangle, or other preselected shape.

BRIEF DESCRIPTION OF THE DRAWING

The invention disclosed herein will be understood better with reference to the drawing of which.

DESCRIPTION OF THE PREFERRED EMBODIMENT

Figure 1:
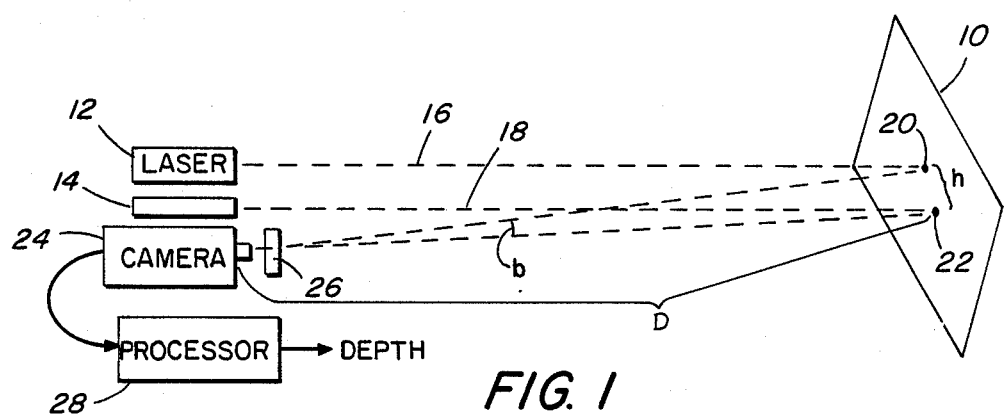
FIGS. 1–3 are schematic illustrations of various embodiments of the present invention.

The present invention determines distance to and orientation of an object utilizing but a single camera and an active feature generation system. The broad concept of the present invention will not be described in conjunction with FIG. 1. In FIG. 1, assume that it is desired to determine the distance to an object 10. A pair of lasers 12 and 14 are provided for illuminating the object 10 with a pair of parallel beams 16 and 18 separated by a distance h. When the beam 16 and 18 intersect the object 10, they create a pair of spots 20 and 22 separated by the distance h which is the distance between the parallel beams 16 and 18. A camera 24, such as a television camera, creates an image of the pair of spots 20 and 22. When imaged by the camera 24, the two spots 20 and 22 subtend an angle b. By elementary geometry, the distance D to the object 10 is given by $D = h/\tan(b)$. For a camera in which the well known thin lens approximation applies, the equation becomes $D = h\,F/hi$ where F is the focal length of the lens of the camera and hi is the size of the feature on the image plane of the camera 24. Thus, the physical size of the feature on the camera image plane along with the known focal length of the camera gives the distance to the object 10. A processor 28 computes depth to the oject 10 by solving the equation $D = hF/h_i$. The projected feature, in this case the spots 20 and 22, can be scanned across the entire field of view of the camera while holding the camera fixed so that the depth structure of the object 10 in the field of view of the camera can be deduced. Thus, the depth structure can be correlated pixel-for-pixel with the two dimensional image represented in the field of view of the camera 24. In the present depthgauging vision system, a prior knowledge of the structure of the two dimensional image is not needed to deduce the depth structure. This information can be acquired completely independently from the two dimensional structure. Thus, the processing required to extract depth information is substantially reduced from that required using multiple cameras in a stereoscopic system. Extracting depth information from the depth-gauging system of the present invention requires only the unambiguous identification of the actively generated feature reflected from the object 10.

The lasers 12 and 14 emit radiation in a narrow spectral region. This can be used to further reduce the image processing required to analyze the depth structure. A spectral filter 26 centered on the wavelength of the feature generating lasers is placed in front of the camera optics during the scanning process. Thus, during the scan across the camera field of view, the most distinct feature in the image will be, most likely, the actively generated feature. With the depth-gauging system of the present invention, it is likely that the depth structure can be mapped more accurately than in a stereoscopic vision system. At a minimum, the errors in the depth-gauging can be quantified since they are simply related to the resolution limits of the camera and the size of the actively generated feature.

Figure 2:
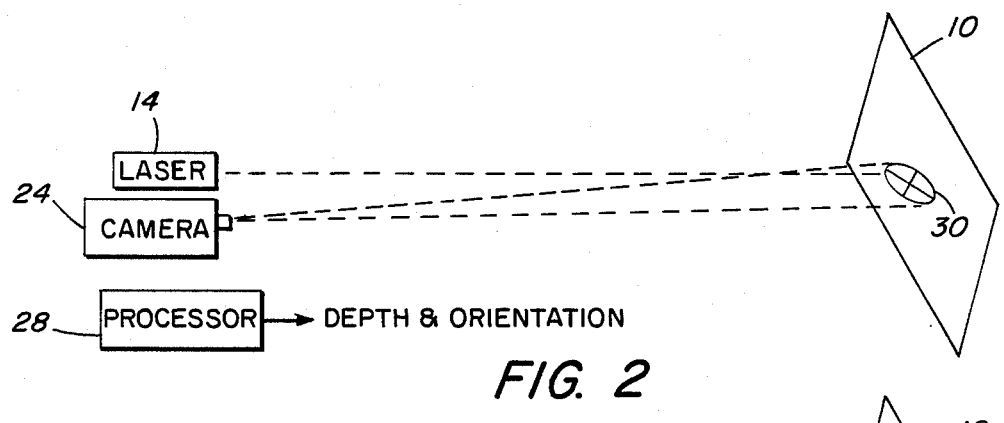

Those skilled in the art will recognize that it is clearly not necessary that the image generator create a two-spot laser feature. The feature generator can be any light source. However, the parallel nature of the feature projection is a strongly desired, but not absolutely required, characteristic. Furthermore, the feature need not be a simple two-spot feature. If the feature, for example, is two dimensional, local surface information can be deduced in addition to depth information. Consider, for the sake of simplicity, that the actively generated feature is a circle. If the object 10 is perpendicular to the circular beam of light, the resultant figure produced on the object will be a circle. If the object is not normal to the beam, the resultant image will be an ellipse 30 as shown in FIG. 2. The ratio of the major to minor axes of the ellipse and the angle made by the major or minor axes to the local horizontal immediately yield the orientation of the surface of the object relative to the projected image. The image processing software in the processor 28 can then be optimized to recognize elliptical features.

In the event that the object has a complex shape, the actively generated structured light feature will take on a complex shape on the camera focal plane. Assuming that the characteristics of the generated feature are well understood, the shape of the surface can be mapped from the observed distortion of the image of the feature in the camera. Conventionally known structured light systems (for example, light striping systems) perform this type of image processing to determine the shape of objects.

Figure 3:
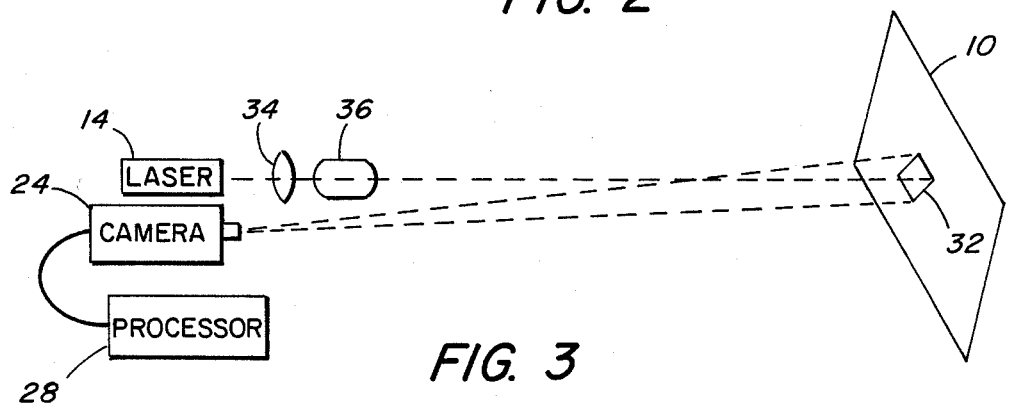

Those skilled in the art will further recognize that it is not necessary for the actively generated feature to be circular. Any easily recognizable feature can be used. Since some image processing systems recognize corners and straight line segments quite readily, the generated feature might be chosen to be a rectangle (or any other polygon). A rectangular feature 32 is shown in FIG. 3. When a laser 14 is utilized, a well collimated rectangular feature 32 can be created by means of a divergent lens 34 followed by a convergent cylindrical lens 36. The feature 32 can then be scanned across the camera 24 field of veiw to determine the depth structure as well as local surface orientation information about the object 10.

It is thus seen that the objects of this invention have been achieved in that there has been disclosed apparatus for measuring distance and orientation utilizing only a single camera. The novel depth-gauging technique is computationally much simpler than known stereoscopic systems which require multiple cameras. It is recognized that modifications and variations of the present invention will occur to those skilled in the art and it is intended that all such modifications and variations be included within the scope of the appended claims.

What is claimed is:

1. Apparatus for determining the distance D of an object with respect to a reference location comprising:
    illumination means for projecting a preselected feature upon the object along a first direction from the reference point to the object, said feature having at least two distinct points separated laterally by a distance h measured transversely to said first direction,
    means positioned at said reference location for generating an image of the feature reflected from the object, said image generating means including a thin lens with a focal length F, said image at the focal plane of said lens having a spacing between the image of said at least two distinct points of $h_i$, and
    processing means for comparing the reflected image $h_i$ of the feature with the preselected feature h to determine the distance D where $D = hF/h_i$.

2. The apparatus of claim 1 wherein the preselected feature is a pair of spaced apart points of light.

3. The apparatus of claim 2 wherein said illumination means comprises two parallel laser beams.

4. The apparatus of claim 1 wherein the preselected feature is a circle.

5. The apparatus of claim 1 wherein the preselected feature is a rectangle.

6. The apparatus of claim 1 wherein said illumination means projects the feature in a narrow spectral region and wherein the imaging means includes a filter responsive to the narrow spectral region.

7. The apparatus of claim 4 wherein the processing means is responsive to the major and minor axes of an ellipse resulting from the circular illumination.

8. Method for determining the distance D of an object with respect to a reference location comprising:
    projecting a preselected feature upon the object along a first direction from the reference point to the object, said feature having at least two distinct points separated laterally by a distance h measured transversely to said first direction,
    optically generating an image of the feature reflected from the object at said reference location where the lateral spacing between the image of said at least two distinct points is $h_i$ and where said image generating is done in a manner that creates a linear relationship between h and $h_i$ that corresponds to the distance D to be measured, and
    comparing the reflected image $h_i$ of the feature with the preselected feature h to determine the distance D where $D = hF/h_i$, F being a constant that is characteristic of said image generating means.

9. The method of claim 8 wherein the preselected feature is a pair of spaced apart points of light.

10. The method of claim 8 wherein the preselected feature is a circle.

11. The method of claim 8 wherein the preselected feature is a rectangle.

* * * * *